United States Patent [19]

Watanabe et al.

[11] Patent Number: 5,093,601

[45] Date of Patent: Mar. 3, 1992

[54] DOUBLE BULB TYPE HALOGEN LAMP IN WHICH A SPACE BETWEEN INNER AND OUTER BULBS IS FILLED WITH A WEAK OXIDATION GAS

[75] Inventors: Tsutomu Watanabe, Yokosuka; Takumi Suwa, Fujisawa, both of Japan

[73] Assignee: Toshiba Lighting & Technology Corporation, Tokyo, Japan

[21] Appl. No.: 456,739

[22] Filed: Dec. 26, 1989

[30] Foreign Application Priority Data

Dec. 28, 1988 [JP] Japan .................. 63-334889

[51] Int. Cl.$^5$ ............................................. H01K 1/26
[52] U.S. Cl. ...................... 313/25; 313/113; 313/578; 313/635
[58] Field of Search .............. 313/25, 113, 580, 579, 313/635, 578

[56] References Cited

U.S. PATENT DOCUMENTS 4,463,277  7/1984  DeCaro .................. 313/573
4,634,919  1/1987  Yuge ...................... 313/113
4,701,663 10/1987  Kawakatsu et al. ..... 313/580
4,918,352  4/1990  Hess et al. .............. 313/25
4,942,331  7/1990  Bergman et al. ........ 313/579

FOREIGN PATENT DOCUMENTS 0164064 12/1985  European Pat. Off. .
57-38558  3/1982  Japan .
57-46461  3/1982  Japan .
57-55161  3/1982  Japan .
60-74259  4/1985  Japan .
8501833  4/1985  PCT Int'l Appl. .

Primary Examiner—Donald J. Yusko
Assistant Examiner—Nimeshkumar D. Patel
Attorney, Agent, or Firm—Cushman, Darby & Cushman

[57] ABSTRACT

In a double bulb type halogen lamp, a sealed space between the inner surface of an outer bulb and the outer surface of the inner bulb in which a coiled filament is disposed is filled with a weak oxidation gas to avoid deoxidation of the optical interference film composed of metal oxide substances exposed to the sealed space.

8 Claims, 2 Drawing Sheets

DOUBLE BULB TYPE HALOGEN LAMP IN WHICH A SPACE BETWEEN INNER AND OUTER BULBS IS FILLED WITH A WEAK OXIDATION GAS

BACKGROUND OF THE INVENTION

1. Field of the Invention

The present invention relates, in general, to halogen lamps. In particular, the invention relates to a double bulb type halogen lamp wherein an optical interference film composed of a selected metal oxide substance is coated on at least either the outer surface of an inner bulb thereof or the inner surface of an outer bulb to transmit visible rays and to reflect infrared rays from a light source thereof.

2. Description of the Related Art

A double bulb type halogen lamp in which a halogen lamp is airtightly enveloped by an outer bulb is used as a reflector lamp, e.g., a sealed beam lamp, to achieve a high output. A prescribed amount of halogen element, e.g., iodine, bromine, etc., or a compound thereof is sealed in the halogen lamp. The temperature of the inner bulb of the halogen lamp greatly increases during the operation to perform a halogen cycle. In recent years, an improved double bulb type halogen lamp has been developed to achieve a high efficiency and to radiate light having a small amount of infrared rays, i.e., a so-called cool beam. In such an improved double bulb type halogen lamp, an optical interference film is formed on the outer surface of the inner bulb to transmit visible rays and to reflect infrared rays. Furthermore, air in a sealed space between inner and outer bulbs is exhausted, or a prescribed amount of inert gas is sealed in the sealed space.

The above-described optical interference film includes a high refractive index layer made of a metal oxide substance, e.g., titanium oxide ($TiO_2$), tantalum oxide ($TaO_2$), or zirconium oxide ($ZrO_2$), and a low refractive index layer made of other metal oxide substance, e.g., silicon oxide ($SiO_2$), or selenium oxide ($SeO_2$), alternately stacked one to the other at six to twenty one layers on the bulb. The light from a specific wavelength range may be transmitted or reflected by controlling thickness of each refractive index layer. When the optical interference film transmits visible rays and reflects infrared rays in light radiated from the light source, i.e., a coil filament, infrared rays reflected by the interference film returns toward the filament and heats up the filament, resulting in a high luminous efficiency in halogen lamp. However, since the heat discharge from the inner bulb of the double bulb type halogen lamp is not effective, the temperature of the inner bulb increases in excess during the operation. The temperature of the base portion of the halogen lamp also increases close to that of the inner tube.

In the above-described conventional double bulb type halogen lamp, the temperature of the optical interference film reaches 500°~800° C. during the operation. The optical interference film becomes black as the temperature of the optical interference film frequently increases to such a high temperature during an extended operation period, and thus, the optical interference film loses the original optical characteristics. The light output of the halogen lamp is greatly reduced.

SUMMARY OF THE INVENTION

Accordingly, it is an object of the present invention to maintain original characteristics of the optical interference film of a double bulb type halogen lamp for an extended operation period.

To accomplish the above-object, a double bulb type halogen lamp includes an outer bulb, and an inner bulb, arranged in the outer bulb for defining a space with the outer bulb, which has a light radiating filament therein. The double bulb type halogen lamp also includes an optical interference film formed on either the inner surface of the outer bulb or the outer surface of the inner bulb for reflecting light from the optical spectrum in a prescribed wavelength range, and a fill sealed in the space for maintaining the space in a weak oxidation state to avoid reduction of the optical interference film.

BRIEF DESCRIPTION OF THE DRAWINGS

These and other objects and advantages of this invention will become more apparent and readily appreciated from the following detailed description of the presently preferred exemplary embodiments of the invention, taken in conjunction with the accompanying drawings, wherein like reference numerals throughout the various figures denote like structure elements and wherein.

DETAILED DESCRIPTION OF THE PREFERRED EMBODIMENT

The inventors of the present invention conducted a chemical experiment regarding to changes in characteristics of metal oxide substances of an optical interference film used in a double bulb type halogen lamp. A chemical process of losing original optical characteristics of the optical interference film will be described based on the experiment.

Deoxidation of a metal oxide substance, e.g., $TiO_2$, $TaO_2$, $SeO_2$, etc., of the optical interference film occurs if the temperature of the optical interference film exceeds 500° C. while the optical interference film has been heated in inert gas, e.g., argon, nitrogen, etc., or in a vacuum for an extended period. The metal oxide substance is gradually degraded to become a low grade oxide substance and is finally a reduced metal. If such a deoxidation of a metal oxide substance occurs in the optical interference film of the double tube type halogen lamp, a wavelength range of reflecting or transmitting light varies, and thus, the original characteristics of the optical interference film are lost.

Based on the above-description, a preferred embodiment of the present invention will be described with reference to the accompanying drawings.

Figure 1:
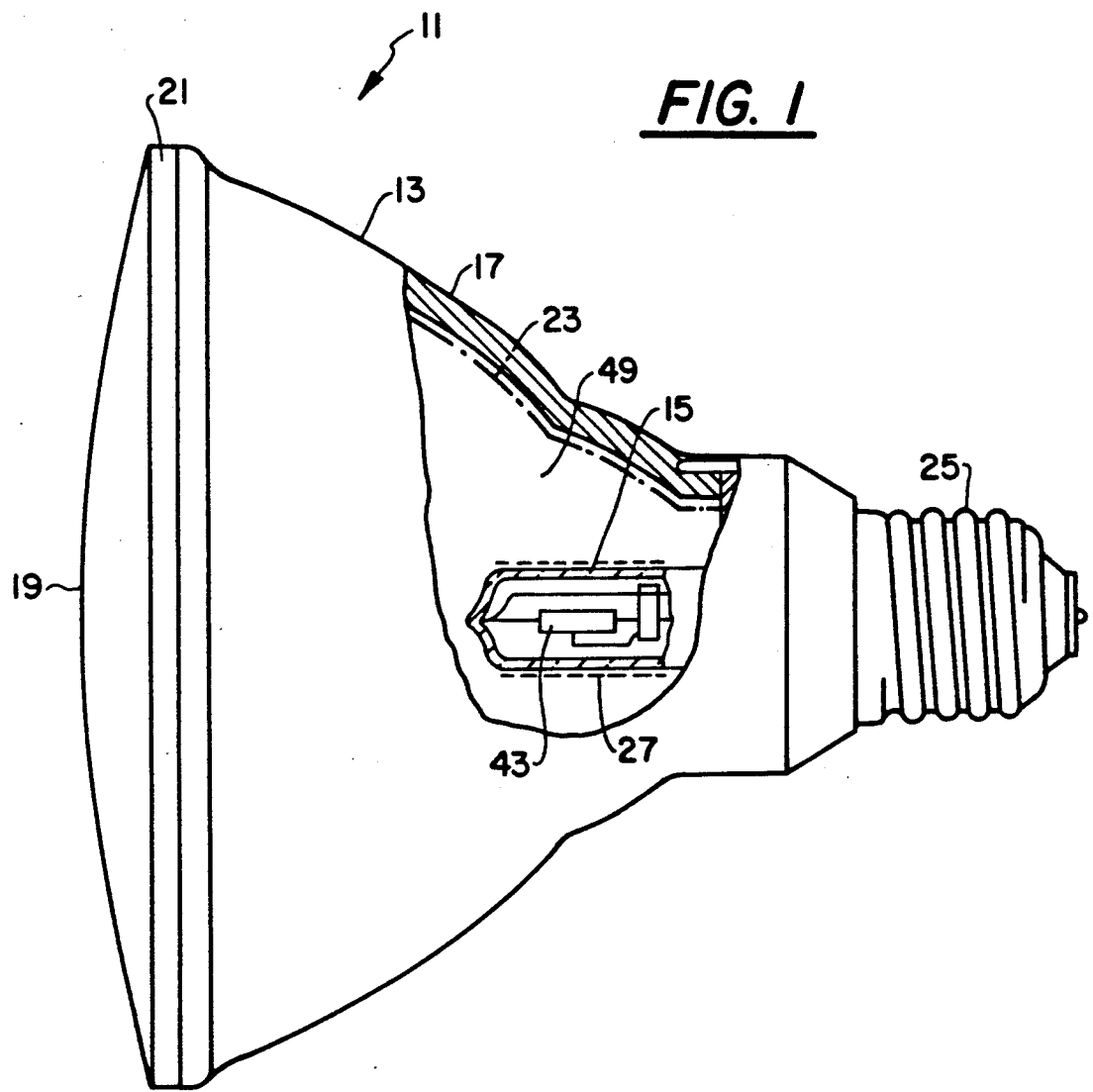
FIG. 1 is a side view, partly in section, illustrating a sealed beam type double bulb halogen lamp of one embodiment of the present invention.

As shown in FIG. 1, a double bulb type halogen lamp 11 includes a funnel shaped outer bulb 13 and an inner bulb 15 arranged in outer bulb 13. Outer bulb 13 includes a PAR (parabolic aluminized reflector) type sealed beam bulb element 17 and a lens element 19 fixed on the front edge of bulb element 17 by an epoxy resin glue 21. Glass welding may be used to fix lens element 19 and bulb element 17. An aluminized reflection film 23, indicated by a dot and dashed line, is formed on the inner surface of sealed beam bulb element 17. A pair of ferrules (not shown) which form part of the electrical contact structure of the lamp are mounted on a closed rear wall of bulb element 17 to fix a pair of support wires 24, shown in FIG. 2, by welding. The pair of support wires 24 whose diameter is 1 mm and length is 40 mm are made of nickel and are used to support inner bulb 15 at an appropriate position in outer bulb 13. A screw type cap 25 is mounted on the rear edge of bulb element 17 and is electrically connected to support wires 24. An optical interference film 27, indicated by a dotted line, is formed on the outer surface of inner bulb 15.

Figure 2:
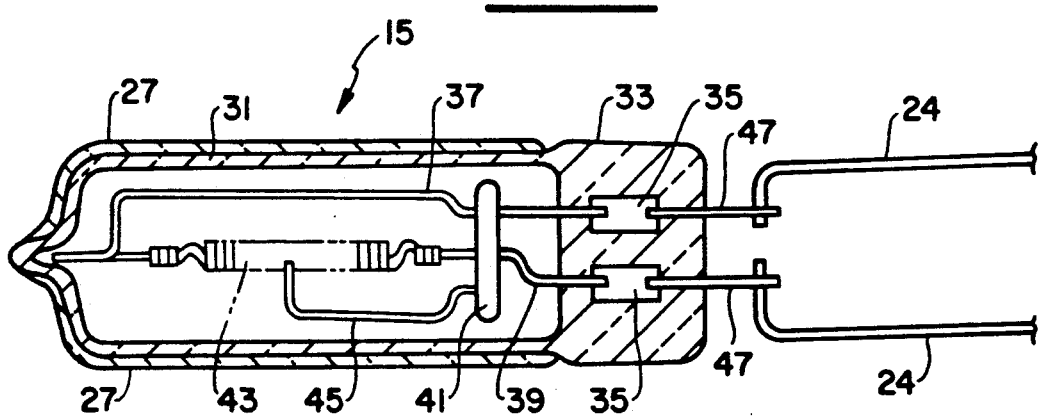
FIG. 2 is an enlarged cross sectional view illustrating the inner bulb of the halogen lamp shown in FIG. 1.

The structure of inner bulb 15 will now be described. As shown in FIG. 2, inner bulb 15 includes a tube 31 made of a heat-resisting glass, e.g., quartz glass, etc. Opposite ends of tube 31 are closed, and one of the opposite ends thereof is pinched to form a flat base 33. A pair of molybdenum foil plates 35 are arranged in parallel in flat base 33. One of the ends of a first inner lead wire 37 is connected to one of the molybdenum foil plates 35, and the other end thereof extends to the other end of tube 31 along the inner surface of tube 31. One end of a second inner lead wire 39 is connected to the other molybdenum foil plate 35, and the other end thereof is positioned in the vicinity of flat base 33. A base portion of each inner lead wires 37, 39 are supported by an insulating supporter 41 inside tube 31. The other end of first inner lead wire 37 and the other end of second inner lead wire 39 are opposed at a prescribed distance along an elongated center line of tube 31. A tungsten coiled filament 43 extends between the opposed ends of first and second inner lead wires 37 and 39. A middle portion of tungsten coiled filament 43 is supported by one of the ends of a bar anchor 45, the other end of which is fixed to insulating supporter 41. One of the ends of each outer lead wire 47 is connected to molybdenum foil plate 35, respectively, and the other end thereof extends to the outside of tube 31. The extended end of each outer lead wire 47 is fixed to support wire 24 to perform an electric connection and a mechanical support. A prescribed amount of halogen is sealed in tube 31 together with a given amount of an inert gas, e.g., argon or nitrogen. The amount of halogen and the inert gas are similar to those in the conventional halogen lamp. Optical interference film 27 coated on the outer surface of tube 31 is formed such that it reflects infrared rays and transmits visible rays.

Figure 3:
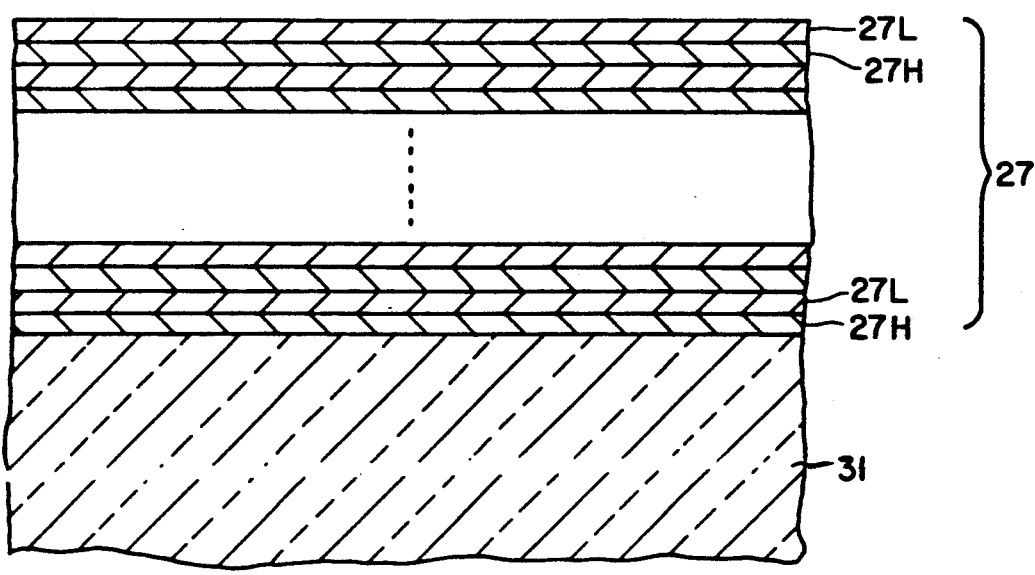
FIG. 3 is an enlarged cross sectional view illustrating the optical interference film coated on the inner bulb of the halogen lamp shown in FIG. 2.

The construction of optical interference film 27 is schematically shown in FIG. 3. Optical interference film 27 includes a high refractive index layer 27H made of a metal oxide substance, preferably $TiO_2$, $TaO_2$ or $ZrO_2$, and a low refractive index layer 27L made of a metal oxide substance, preferably $SiO_2$ or $SeO_2$. Each refractive index layer 27H, 27L is alternately stacked on the outer surface of tube 31 of inner bulb 15. In this case, high refractive index layer 27H is formed on the outer surface of tube 31, and then low refractive index layer 27L is stacked on high refractive index layer 27H. In this manner, high and low refractive index layers 27H and 27L are alternately stacked at 6 to 21 layers in total. Thickness of each refractive layer 27H, 27L is regulated at a suitable value to reflect light, e.g., infrared rays, from the optical spectrum in a prescribed wavelength range by the interference of light.

In this embodiment, a space 49 defined by outer and inner bulbs 13 and 15 is maintained at an atmosphere of weak oxidation. An inert gas including argon of 90 capacity % and nitrogen of 10 capacity % is sealed in space 49 at 300~1520 Torr together with oxygen of 0.28~0.6 Torr (500~1000 PPM).

In the above-described double bulb type halogen lamp, when tungsten coiled filament 43 is energized, filament 43 heats up at a high temperature to generate light including infrared rays and visible rays. When the light generated by filament 43 enters into optical interference film 27 through inner bulb 15, optical interference film 27 transmits visible rays and reflects infrared rays by the light interference. Visible rays transmitted from optical interference film 27 are reflected by aluminized reflection film 23, and thus, radiated toward the outside of outer bulb 13 through lens element 19. Infrared rays reflected by optical interference film 27 returns to filament 43 and heats up filament 43. As a result, a luminous efficiency of lamp 11 is greatly improved.

During the above-described operation of lamp 11, tube 31 including base portion 33 is heated at a high temperature by filament 43. However, cooling to tube 31 is not effective because of the double bulb construction, and thus, temperatures of both tube 31 and optical interference film 27 increase at about 800° C. Temperature of base portion 33 of tube 31 also increases at substantially the same temperature as tube 31. However, neither oxidation nor deoxidation occur on the metal oxide substance of each refractive index layer and the original composition of the metal oxide substance of each refractive index layer, e.g., degree of oxidation of $TiO_2$ or $SiO_2$, is maintained for an extended operation period. This is because space 49 is filled with an inert gas including a small amount of oxygen and the pressure of decomposing oxygen of each metal oxide substance substantially balances with the pressure of oxygen in space 49. Thus, metal oxide substance of each refractive index layer 27H, 27L is reoxidized by oxygen in space 49 even if metal oxide substance of each refractive index layer 27H, 27L is decomposed and oxygen therein escapes into space 49. The original optical characteristics of optical interference film 27 can be maintained for an extended operation period. The transmission/reflection wavelength range of optical interference film 27 does not change and the light transmission factor thereof does not greatly decrease. Furthermore, since the degree of oxidation in space 49 is low, molybdenum foil plates 35 are hardly oxidized even though foil plates 35 are subject to a high temperature when the gas filled in space 49 enters into flat base 33 of inner tube 15 along each outer lead wire 47. Thus, the airtightness of inner tube 15 is not adversely affected for an extended operation period.

In the present invention, it is required that the weak oxidation in space 49 does not cause deoxidation of optical interference film 27 or oxidation of both molybdenum foil plates 35 and outer lead wires 47. For these reasons, it is preferable to include oxygen at a partial pressure of 0.0076~76 Torr in the inert gas, e.g., argon or nitrogen, filled in space 49 at a conventional sealed pressure, i.e., 300~1520 Torr. However, in view of the accuracy of mixing a proper amount of oxygen into the inert gas, it is more preferable to include oxygen at a partial pressure of 0.04~3.3 Torr (100~5000 PPM) in the inert gas filled in space 49 at a pressure of 450~650 Torr.

In the above-described embodiment, the present invention is applied to a sealed beam type halogen lamp. However, the invention may be applied to a double tube type halogen lamp wherein a tube type inner bulb is coaxially supported in a tube type outer bulb and an optical interference film is coated on at least either the inner surface of the outer bulb or the outer surface of the inner bulb. A similar result to the above-described embodiment may be achieved even if temperature of the double tube type halogen lamp increases above 500° C.

The present invention has been described with respect to a specific embodiment. However, other embodiments based on the principles of the present invention will be obvious to those of ordinary skill in the art. Such embodiments are intended to be covered by the claims.

What is claimed is:

1. A double bulb type halogen lamp comprising:
   an outer bulb having an inner surface;
   an inner bulb having an outer surface arranged in the outer bulb for defining a sealed space with the outer bulb;
   a filament disposed in the inner bulb for radiating light, said filament generating heat during the operation;
   an optical interference film arranged on one of the inner surface of outer bulb and the outer surface of the inner bulb for reflecting light from the optical spectrum in a prescribed wavelength range, the optical interference film being a metal oxide substance subject to deoxidation under the influence of said heat from said filament; and
   a weak oxidizing fill disposed in said sealed space preselected so as to prevent deoxidation of said optical interference film, comprising:
   a predetermined amount of inert gas of a sealed pressure of 300–1520 Torr;
   a predetermined amount of oxygen having a partial pressure of 0.0076–76 Torr.

2. A lamp according to claim 1, wherein the inert gas includes argon.

3. A lamp according to claim 1, wherein the inert gas includes nitrogen.

4. A lamp according to claim 1, wherein the outer bulb includes a funnel shaped body having a first edge of a first diameter and a second edge of a second diameter greater than the first diameter of the first edge, and a lens element integrally fixed on the second edge of the funnel shaped body.

5. A lamp according to claim 4, wherein the funnel shaped body has an inner wall and the outer bulb also includes an optical reflection film on the inner wall of the funnel shaped body.

6. A lamp according to claim 5, wherein the outer bulb includes means for supporting the inner bulb arranged opposite to the optical reflection film.

7. A lamp according to claim 6, wherein the outer bulb includes a cap formed on the first edge of the funnel shaped body thereof.

8. A lamp according to claim 1, wherein the optical interference film includes a first refractive index layer having a prescribed index on one of the outer surface of the inner bulb and the inner surface of the outer bulb, and a second refractive index layer having a predetermined index lower than that of the first refractive index layer on the first refractive index layer, the first refractive index layer including a first metal oxide substance, the second refractive index layer including a second metal oxide substance different from the first metal oxide substance.

* * * * *